Oct. 26, 1971          L. J. KAMM          3,615,136

STROBOSCOPE VIEWING DEVICE

Filed March 17, 1969

INVENTOR.
LAWRENCE J. KAMM

BY

*Carl R. Brown*

ATTORNEY

United States Patent Office 3,615,136
Patented Oct. 26, 1971

3,615,136
STROBOSCOPE VIEWING DEVICE
Lawrence J. Kamm, San Diego, Calif., assignor to March 23rd Corporation, doing business as Minear Company, San Diego, Calif.
Filed Mar. 17, 1969, Ser. No. 807,799
Int. Cl. G01p 3/40
U.S. Cl. 356—25           2 Claims

ABSTRACT OF THE DISCLOSURE

A stroboscope viewing device that has a group of parallel, spaced plates that are rotated at selectable and controlled speeds to provide stop motion viewing of a rotating or reciprocating object and that directs a separate pulsing light source onto the moving object in synchronism with the viewing of the object through the rotating plates.

BACKGROUND OF THE INVENTION

It is very desirable to determine quickly and easily the speed of moving parts in a machine, to view these parts as if they are virtually standing still, and to examine these parts in detail as they appear to operate in "slow motion." Such stop-action viewing of a machine while it is working normally, can tell much about its speed of operation and its operating characteristics and condition. For example, in such an examination it is possible to tell if a shaft is whipping, if gears are not meshing properly, if propeller blades are tracking or if different parts of a machine are out of synchronization.

There are devices that will accomplish some of the above functions. A high intensity light stroboscope for example can be set to provide a blinking light output having a speed somewhat comparable to moving parts in a machine. Such light stroboscopes work somewhat well in dark conditions but are relatively ineffective in ambient light or in well lighted conditions in which machinery is often positioned. Further while light stroboscopes can illuminate moving parts as though they were standing still, these stroboscopes have limitations in facilitating examination of equipments from an overall view, and also where it is desired to examine related parts in a slow motion view. The sight view of stroboscopes is limited to the spot size of the light projected. Further stroboscopes are expensive, have complex mechanisms, are bulky, are not completely portable as they normally require a large power source, and are fragile.

Thus it is advantageous to have a hand operated, portable, rugged electromechanical stroboscope viewing device that works in bright light and at a distance, is battery operated so that it can be taken out on the job and that allows viewing of fast moving parts in a machine as though they were virtually standing still or operating in slow motion, and that will determine the speed of movement of the part involved.

SUMMARY OF THE INVENTION

In an exemplary embodiment of this invention, the stroboscope viewing device employs a "light chopper" that comprises a series or group of closely spaced, precisely positioned, parallel plates. The plates are rotated by a miniaturized electric motor that is battery driven, and its speed is continuously adjustable. When the plates are aligned with the line of sight through the space between individual plates, then an object can be momentarily seen through the rotating group of plates. To "stop" the motion of a rotating or reciprocating machine part, the speed of rotation of the plates is adjusted until it is exactly synchronized with the part. When the two speeds are synchronized, the viewer sees the part once every rotation or once per stroke and it appears to stand still. When the rotational speed of the plates is adjusted so that it varies slightly from synchronization, then the part being viewed appears to operate in slow motion through its complete cycle. The object or part to be viewed is viewed through a telescope that is focused by adjusting an eye piece on a light enclosure that encloses the rotating group of plates. A DC motor rotates the plates and electrical power to the DC motor is proportional to the speed of rotation of the plates. A DC meter circuit is connected across the input electrical power lines to the motor and by synchronizing the meter reading to rotational speed, a direct readout of the rotational speed of the plates and the moving part is displayed on the meter.

While the stroboscope viewing device is primary used in ambient light, it is sometimes desirable to use it where the light conditions are poor. In these situations, means are provided for synchronizing the light pulse output of a light stroboscope so that the light output of the stroboscope is synchronized with the rotational speed of the group of plates, thus providing illumination of the rotating or reciprocating part at the exact moment that the operator views the stopped moving part through the parallel plates. This accentuates the viewing of the part in dim light and to specific portions thereof.

It is therefore an object of this invention to provide a new and improved portable and hand operated device for viewing moving parts as though they were standing still or operating in slow motion.

It is another object of this invention to provide a new and improved stroboscope viewing device.

It is another object of this invention to provide a new and improved stroboscope viewing device for inspecting rotating objects in ambient light or in high intensity light.

It is another object of this invention to provide a new and improved stroboscope viewing device for inspecting objects moving in cycles, as to their operating characteristics and conditions, and to determine the cycle rate of the objects.

It is another object of this invention to provide a new and improved stroboscope viewing device for inspecting moving objects, that is small in size, simple to use, inexpensive to construct, completely portable, battery operated, and that has a rugged construction that works well in bright light and even at a distance.

It is another object of this invention to provide a new and improved stroboscope viewing device for inspecting moving objects that has a rotating light chopper that is operated in a small confined space and yet provides a large field of vision.

Other objects and many advantages of this invention will become more apparent upon a reading of the following detailed description and an examination of the drawings wherein like reference numerals identify like parts throughout and in which.

Figure 1:
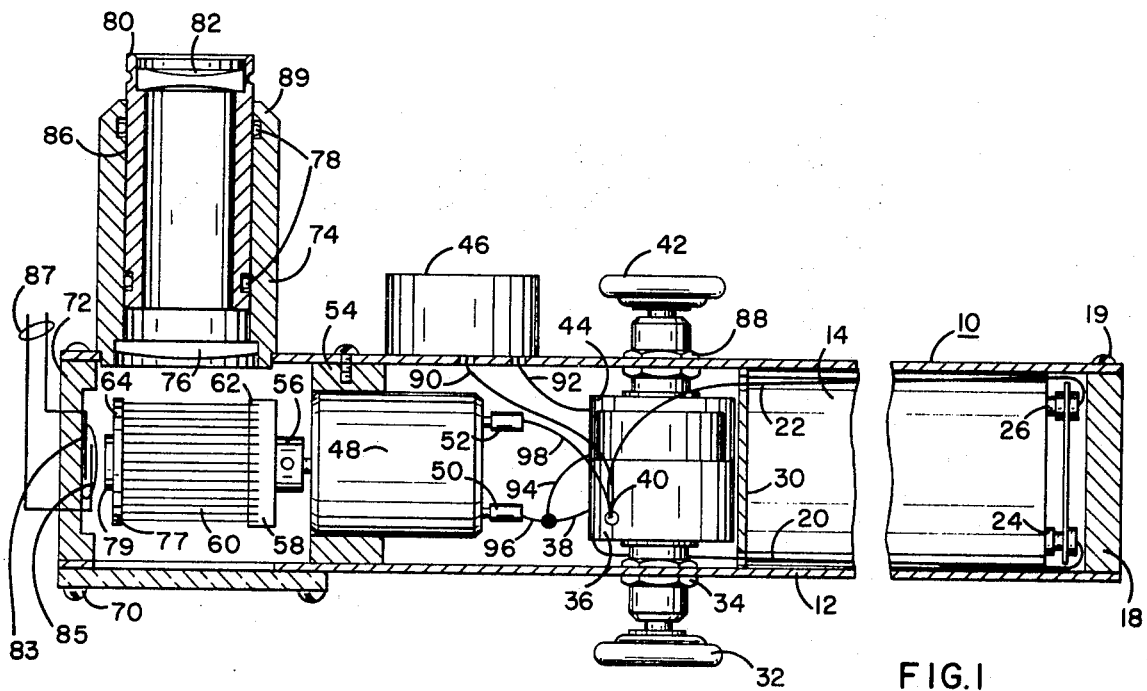
FIG. 1 is a cross sectional view with parts broken away of an embodiment of the stroboscope viewing device of this invention.

Referring now to FIG. 1, an exemplary embodiment of the stroboscope viewing device 10 has a case 12 that may be made of metal or other suitable materials and has an elongated rectangular shape. The lower end is closed by a plate 18 that is held by screw member 19, making end 18 removable for replacement of the battery 14. Normal battery connector lines 20 and 22 carry electrical power to a potentiometer 36. Potentiometer 36, as will be described in more detail hereinafter, controls the DC power through lines 96 and 98 and connectors 50 and 52 to a DC motor 48. DC motor 48 through drive coupling 56 rotates a group of plates 58, that comprise a plurality of individual thin plates 60 that are arranged in a close and uniformly spaced parallel orientation and are secured in this position by end plates 62 and 77. The motor 48 is held in position by a spacer clamp 54 that is secured to the case 12 by a suitable fastener. The case 12 has openings on either side adjacent to the parallel plates 58. The opening on the incoming light side is closed by a transparent window 68. The other opening is closed by an eye piece 87 that includes a lens system 80 comprising lens 76 and 82. The lens are held in a telescoping member 86 that is moved against the friction force of inserts 78 to allow focusing of the telescope lens system 80, that may have in the order of 2 to 4 power. The telescope lens system 80 focuses the image through the light passages of plates 60 and the lens system 80.

Figure 2:
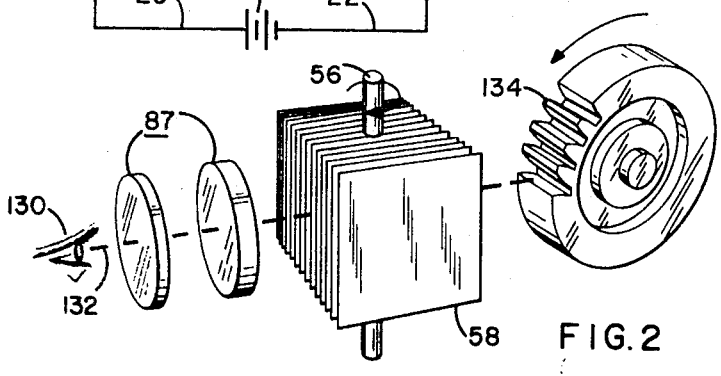
FIG. 2 is an illustrated schematic view of the operation of the rotating plates of this invention.

In operation of the invention thus far described, see FIG. 2, the eye 130 views the rotating gear 134 along dotted line 132 and through lenses 87 and rotating plates 58. Only when the plates 60 are aligned with the line of sight, can the operator see between the plates and view the gear 134. The speed of rate of rotation of the plates is adjusted until it is exactly synchronized with the speed of rotation of the gear. It should be recognized that the speed of rotation of the plates is one-half the cycle rate of the gear 134, since there are two views through the plates for each rotation of the plates 58. When the rate of rotation of plates 58 are synchronized with the rotating speed of gear 134, then the gear appears to be stopped. Slight variations of synchronizing speed between the two moving mechanisms, allows a slow motion view of the gear 134. Thus the speed of rotation of plates 58 establishes the speed rate of movement of the gear 134. The potentiometer 36 has a control knob 32 that projects through connectors and opening 34 in the side of the case 12. Rotation of the potentiometer 36 varies the power in lines 96 and 98 and the speed of rotation of DC motor 48, which may be a DC permanent magnet motor, thus varying the speed of rotation of the group of plates 58.

A DC meter 46 is connected by lines 90 and 92 in parallel with the input lines 96 and 98 to the DC motor. Potentiometer 44 controlled by knob 42 is in series with the line to the DC meter permitting adjustment and calibration of the meter reading. DC meter 46 displays the DC power to the DC motor 48 in a revolutions per minute scale calibrated to read-out the rotational speed of the group of plates 58. Thus a direct readout of the speed of rotation of plates 48 provides a direct readout of speed of rotation of the moving or reciprocating object.

Figure 3:
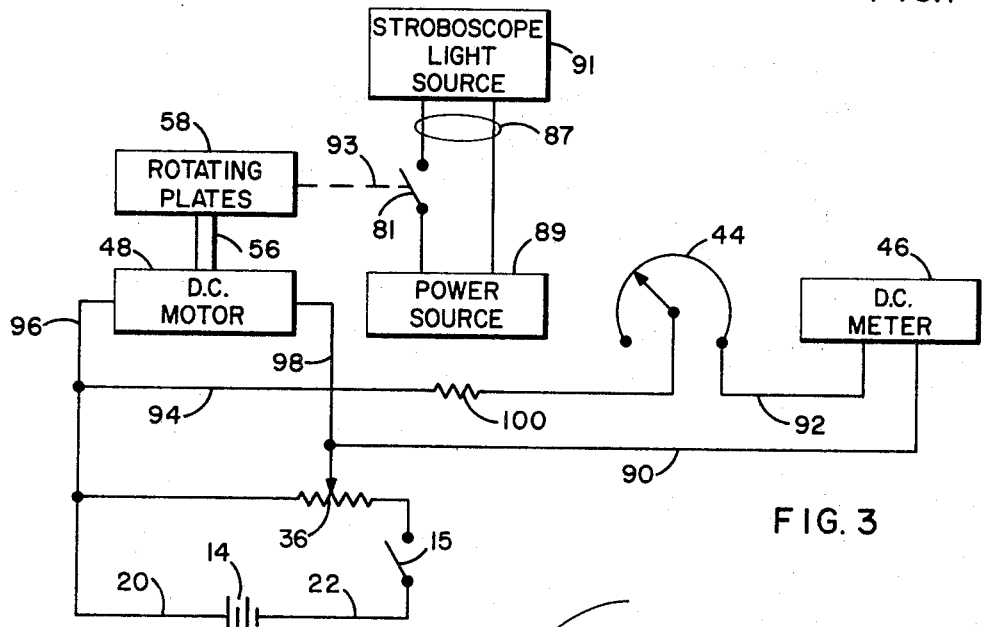
FIG. 3 is a block diagram and schematic diagram of the electrical circuit and operating parts of an embodiment of this invention.

Referring to FIG. 3, the battery 14 is connected through lines 20 and 22, control switch 15, through lines 96 and 98 to the DC motor 48. Potentiometer 36 controls the power and thus the speed of the DC motor 48. The DC motor 48 rotates the group of plates 58 through the drive shaft 56. The DC meter 46 is connected across power lines 96 and 98 by lines 94 and 90. A potentiometer 44 allows calibration of the DC meter 46 to display directly the speed of rotation of the plates 58. Resistor 100 functions as a current limiting resistor.

As apparent from the preceding description, the operation of this invention does not require a light source. Rather it operates effectively in daylight or in normal light conditions. However sometimes it is desirable to use the device 10 in poorly lighted conditions. Accordingly a stroboscope light source 91 is employed in combination with device 10. The stroboscope light source 91, that is powered by power source 89, provides a blinking light beam on a time sequence determined by the opening and closing of switch 81, that is controlled by the rotating plates 58 via the dotted line 93. The switch 81 and operating connection 93 comprises a magnetic reed switch 81, see FIG. 1, that is mounted and secured in any suitable manner to the underneath surface of plate 72. The electrical contacts 83 and 85 of the reed switch 81, that are mounted in the glass enclosures, are connected by lines 87 to the light stroboscope 91. A pair of bar magnets 79 are positioned at opposite sides of and supported on the square plate 77. The magnetic reed switch 81 is positioned to the side of the plate 72 and thus the magnets 79 pass thereunder upon rotation of the plates 58. The lines of flux from north and south poles of the bar magnets 79 cause the contacts 83 and 85, that are normally spring biased apart, to close and open at very high speeds that may be in the order of microseconds. The two bar magnets 79 close contacts 83 and 85 twice for each complete rotation of the group of plates 58, triggering the light strobe providing a light flash for each view of the moving part for each complete rotation of the parallel plates 58.

In further operation, a rotating part is observed by adjustment of the telescope eye piece 87. The rotation speed is synchronized to the moving part or at a submultiple of the parts speed by adjustment of potentiometer 44 through knob 32. The device is calibrated by directing the viewing window 68 towards neon or florescent lights that pass through two complete bright and dim cycles for each cycle of line current. The highest synchronizing speed for these lights is 7200 r.p.m. when operated from 60 c.p.s. power. Accordingly the stroboscope viewing device 10 can be synchronized on submultiples, such as 3600, 2400 and 1800 c.p.s. for example. With the meter 46 calibrated to the speed of rotation of the plates 58, then the stroboscope viewing device 10 is directed towards a moving part. The speed rotation of the plates is then adjusted and controlled by potentiometer 36 to stop the fast moving part as though it were standing still. The reading of meter 46 is observed giving the revolutions per minute of rotation of the moving part. By movement of knob 32, the rotation of stacked plates 58 can then be selectively adjusted to obtain slow motion of movement of the working part, allowing the operation of the working part to be observed. Where the light is dim, then the strobe light unit 91 may be used with the stroboscope viewing device to provide additional light that is synchronized with the rotation of the plates 58, allowing viewing of the moving part only at the time that it is illuminated by the strobe unit 91. Since the group of plates reduces the amount of light available to the viewer's eye in proportion to "open time" vs. "closed time," it may be advantageous to use other light means for additional illumination of the object or part. A light that may be used for this purpose is a high intensity portable lantern.

From the foregoing description it can be recognized that the use of the rotating plates provides a rapid revolving shutter that can be confined in a very small space, be operated simply and inexpensively and with sufficiently low power that it is battery powered. This allows the entire unit to be housed in a compact and light weight case that facilitates portable hand use.

Having described my invention, I now claim.

1. A hand held stroboscope device for inspecting and viewing rotating and reciprocating objects comprising:
   an elongated housing having openings at each end thereof and sight openings adjacent one end normal to the longitudinal axis of the housing, closure means for the end openings,
   an electrical power source in the housing adjacent the other end of the housing,
   an electric motor in the housing positioned and held therein inwardly of the sight openings and connected to the power source,
   a first potentiometer within the housing between the motor and power source and connected in the connection between the power source and motor to vary the amount of current supplied to the motor to regulate the speed thereof, a first control means outside of the housing operatively connected with the first potentiometer to control the same, a light chopper in the housing adjacent the one end thereof and between the sight openings, the light chopper comprising a group of closely spaced substantially flat and identical plates, one end mounting plate mounted on an armature of the motor and rotatable therewith and a second end mounting plate, the flat and identical plates being mounted between and on the end plates in parallel relation bearing a light passage between each plate, one of the sight openings having an eye piece therein, means to move the eye piece to focus the same, the eye piece allowing viewing of light and the object through the chopper and the other sight opening at the time in each rotation of the chopper when the light is passing through the parallel plates, the first potentiometer controlling the power to the motor and the speed of rotation of the chopper to agree with the movement of the object, a second potentiometer within the housing adjacent the first potentiometer and connected in the connection between the power source and the motor, a second control means to control the second potentiometer.

a meter in the connection in the second potentiometer, the meter being calibrated in revolutions per minute, the second potentiometer when adjusted will cause the meter to indicate the rate of rotation of the chopper and will be set to agree with the movement of the object and through control of the first potentiometer the rotation of the chopper will be synchronized with the movement of the object.

2. The device as set forth in claim 1 wherein there is a light attached to the housing, the light having a power source connected thereto and a switch in the connection, the switch being mounted on an inner wall of the closure means at the one end of the housing, means on the second end mounting plate operating the switch on each rotation of the light chopper, the light when energized illuminating the object at the moment that the light chopper allows light to pass through the parallel plates.

References Cited

UNITED STATES PATENTS

| | | | |
|---|---|---|---|
| 1,807,149 | 5/1931 | Butler et al. | 356—25 |
| 1,811,481 | 6/1931 | Stone | 356—25 |

FOREIGN PATENTS

| | | | |
|---|---|---|---|
| 201,656 | 8/1923 | Great Britain | 356—25 |

RONALD L. WIBERT, Primary Examiner

F. L. EVANS, Assistant Examiner